(12) United States Patent
Mori et al.

(10) Patent No.: US 7,466,645 B2
(45) Date of Patent: Dec. 16, 2008

(54) OFDM SIGNAL RECEIVING APPARATUS

(75) Inventors: Ryosuke Mori, Ibaraki (JP); Koji Setoh, Hirakata (JP); Daisuke Hayashi, Neyagawa (JP); Tetsuya Yagi, Katano (JP); Noritaka Iguchi, Kadoma (JP); Akira Kisoda, Moriguchi (JP); Sadashi Kageyama, Sanda (JP)

(73) Assignee: Panasonic Corporation, Osaka (JP)

( * ) Notice: Subject to any disclaimer, the term of this patent is extended or adjusted under 35 U.S.C. 154(b) by 597 days.

(21) Appl. No.: 11/302,872

(22) Filed: Dec. 14, 2005

(65) Prior Publication Data

US 2006/0146693 A1 Jul. 6, 2006

(30) Foreign Application Priority Data

Dec. 21, 2004 (JP) ............................. 2004-368781

(51) Int. Cl.
*H04J 11/00* (2006.01)

(52) U.S. Cl. ..................................... 370/208

(58) Field of Classification Search ................. 370/208, 370/204, 205, 206, 207, 209, 210, 328, 329, 370/330, 335, 342, 343; 455/134, 135, 133; 375/267, 347
See application file for complete search history.

(56) References Cited

U.S. PATENT DOCUMENTS 6,603,961 B1 * 8/2003 Kuroda ........................ 455/133
6,628,638 B1 * 9/2003 Sato et al. .................... 370/343

FOREIGN PATENT DOCUMENTS

JP 2001-156738 6/2001
JP 3389178 1/2003

* cited by examiner

*Primary Examiner*—Chi H Pham
*Assistant Examiner*—Alexander Boakye (57) ABSTRACT

Disclosed is an OFDM signal receiving apparatus for diversity reception, with a plurality of antennas, of an OFDM signal containing Y sub-carriers, where $2^{X-1}<Y<2^X$ and X>1. The OFDM signal receiving apparatus includes a plurality of receiving systems, and a diversity processing unit connected to the receiving systems and fed with sequences of data on sub-carriers demodulated by the respective receiving systems. At least one of the receiving systems includes an FFT circuit for Fast Fourier transforming, in parallel, only a sequence of data on $2^Z$ sub-carriers contained in the OFDM signal received with a corresponding antenna, where X>Z. The diversity processing unit performs a diversity process on sequences of data on sub-carriers, out of all the Y sub-carries, redundantly demodulated.

6 Claims, 5 Drawing Sheets

FIG. 5 PRIOR ART

OFDM SIGNAL RECEIVING APPARATUS

This application is based on an application No. 2004-368781 filed in Japan, the contents of which are hereby incorporated by reference.

BACKGROUND OF THE INVENTION

(1) Field of the Invention

The present invention relates to a technique for a diversity process of an OFDM signal.

(2) Description of the Related Art

The OFDM (Orthogonal Frequency Division Multiplexing) is a technique of multi-carrier transmission of digital data and employed, for example, in ISDB-T (Integrated Services Digital Broadcasting-Terrestrial transmission) used in Japan and DVB-T (Digital Video Broadcasting-Terrestrial transmission) used in Europe.

Figure 5:
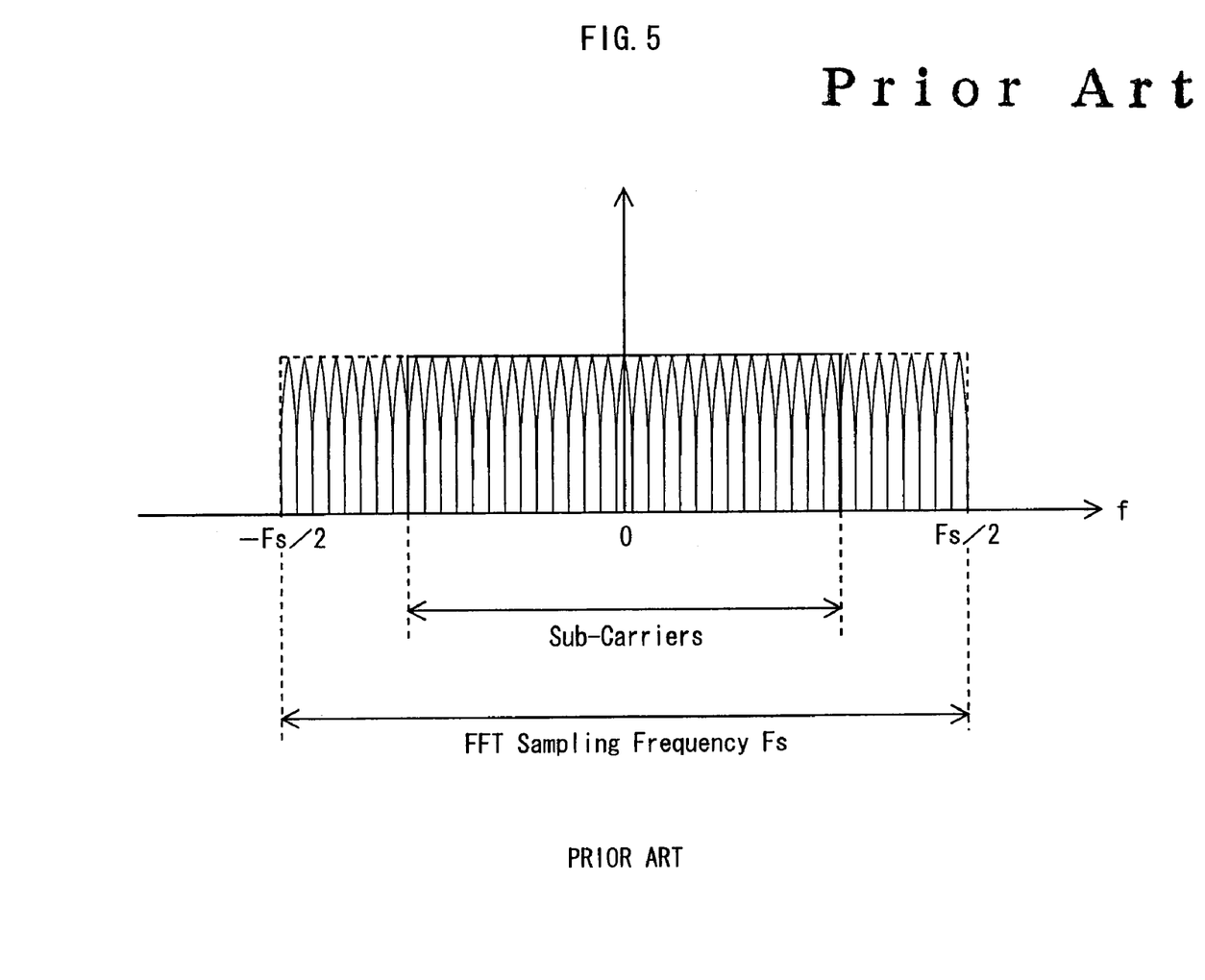
FIG. 5 shows the frequency allocation of an OFDM signal.

FIG. 5 shows the frequency allocation of an OFDM signal.

The sub-carriers shown in the figure refer to carriers carrying data. For example, according to the ISDB-T/Mode 3 system conforming to the ARIB (Japanese Association of Radio Industries and Business) STD-B31 standard stipulating "Transmission System pertaining to Digital Terrestrial Television Broadcast", the bandwidth of sub-carriers is 5.572 MHz, each spacing between the carriers is 0.992 kHz, and the total number of carriers is 5,617.

An OFDM transmitter adds carriers together called a guard band at both edge of the sub-carrier frequency band, so as to generate 8,192 carriers in total, which is a power of 2. The transmitter then generates an OFDM signal using Inverse Fast Fourier Transform (IFFT) of the 8,192 carriers at the sampling frequency Fs=8.127 MHz and transmits the OFDM signal.

Upon receipt from the transmitter, the receiver demodulates the received OFDM signal by orthogonal demodulation, Fast Fourier Transform (FFT), detection, error correction, and so on.

With the use of multiple sub-carriers to transmit data, OFDM is robust against multipath interference adversely affecting the frequency selectivity and thus exhibits excellent reception performance.

Yet, in a severe environment as in the case where the receiver is a mobile unit, the reception performance decreases. One way to improve the reception performance is a technique called diversity reception. To implement diversity reception, a plurality of antennas is used for reception. An OFDM signal received with the respective antennas is subjected to a diversity process to recover the quality of the received signal.

A conventional OFDM diversity receiver has separate receiving systems one for each antenna, and each receiving system independently demodulates the OFDM signal received with a corresponding antenna. Thus, a larger number of receiving systems inevitably gives a rise to a problem of a larger circuit size.

Generally, receivers envisioned to require diversity reception include mobile phones and car navigation systems, which are the products required to be as compact as possible. In view of this, there is a demand for reducing the circuit size.

SUMMARY OF THE INVENTION

In view of the above, the present invention aims to provide an OFDM signal receiving apparatus and an integrated circuit used for the OFDM signal receiving apparatus each of which is smaller in circuit size than a conventional circuit size and still improves the reception performance by implementing diversity reception.

In order to achieve the above aim, the present invention provides an OFDM signal receiving apparatus for diversity reception of an OFDM signal with a plurality of antennas. The OFDM signal contains Y sub-carriers. Y is a positive number satisfying $2^{X-1} < Y < 2^X$ and X is a positive number greater than 1. The OFDM signal receiving apparatus includes: a plurality of receiving systems each independently operable to demodulate the OFDM signal received with a respective one of the antennas; and a diversity processing unit connected to the receiving systems and fed with sequences of data on sub-carriers demodulated by the respective receiving systems. At least one of the receiving systems includes an FFT circuit operable to Fast Fourier transform, in parallel, only a sequence of data on $2^Z$ sub-carriers contained in the OFDM signal received with a corresponding antenna. Z is a positive number satisfying X>Z. At least another of the receiving systems demodulates a sequence of data on some or all of said $2^Z$ sub-carriers contained in the OFDM signal received with a corresponding antenna. The respective receiving systems demodulate sequences of data so as to together cover all the Y sub-carriers. The diversity processing unit performs a diversity process on the sequences of data on sub-carriers, out of all the Y sub-carries, redundantly demodulated by two or more of the receiving systems.

In another aspect, the present invention provides an integrated circuit included in an OFDM signal receiving apparatus for diversity reception of an OFDM signal with a plurality of antennas. Y is a positive number satisfying $2^{X-1} < Y < 2^X$ and X is a positive number greater than 1. The integrated circuit includes: a plurality of receiving systems each independently operable to demodulate the OFDM signal received with a respective one of the antennas; and a diversity processing unit connected to the receiving systems and fed with sequences of data on sub-carriers demodulated by the respective receiving systems. At least one of the receiving systems includes an FFT circuit operable to Fast Fourier transform, in parallel, only a sequence of data on $2^Z$ sub-carriers contained in the OFDM signal received with a corresponding antenna. Z is a positive number satisfying X>Z. At least another of the receiving systems demodulates a sequence of data on some or all of said $2^Z$ sub-carriers contained in the OFDM signal received with a corresponding antenna. The respective receiving systems demodulate sequences of data so as to together cover all the Y sub-carriers. The diversity processing unit performs a diversity process on the sequences of data on sub-carriers, out of all the Y sub-carries, redundantly demodulated by two or more of the receiving systems.

Generally, an FFT circuit for computing FFT algorithms is especially large among all the circuits included in a receiving system. In addition, the size of FFT circuit increases in proportion to the number of algorithms that can be concurrently performed in parallel (hereinafter, referred to as the "number of FFT points").

For example, in the case of an OFDM signal compliant with the ISDB-T/Mode 3 system, the number of sub-carriers contained therein is 5,617. Thus, each receiving system of a conventional OFDM signal receiver includes an FFT circuit for handling 8,192 FFT points, which is a power of 2.

An FFT circuit designed for 8,192 FFT points is about twice as large as an FFT circuit designed for 4,096 FFT points.

According to the above OFDM signal receiving apparatus and integrated circuit of the present invention, at least one of the receiving systems can include an FFT circuit capable of only as many FFT points as required to Fast Fourier transform data on $2^z$ sub-carriers, which is fewer than the entire Y sub-carriers, in parallel. Consequently, the circuit size is smaller as compared with a conventional apparatus of which receiving systems each include an FFT circuit capable of computing in parallel as many algorithms as $2^x$ FFT points, which is larger than Y.

Here, the receiving systems may be a first receiving system and a second receiving system connected to a different one of the antennas. The first receiving system may include said FFT circuit. The second receiving system may include a second FFT circuit operable to Fast Fourier transform in parallel a sequence of data on the Y sub-carriers. The diversity processor may perform a diversity process on sequences of data on said $2^z$ sub-carriers, out of all the Y sub-carries, redundantly demodulated by the first and second receiving systems.

With the above structure, the size of FFT circuit included in the first receiving system is reduced as compared with that of an FFT circuit included in a conventional apparatus.

Here, the receiving systems may be a first receiving system and a second receiving system connected to a different one of the antennas. The first and second receiving systems may each include said FFT circuit and demodulate sequences of data, so that the data sequences together cover all the Y sub-carriers and that data on some of the Y sub-carriers are redundantly demodulated by both the first and second receiving systems. The diversity processing unit may perform a diversity process on sequences of data on sub-carriers, out of all the Y sub-carries, redundantly demodulated by the first and second receiving systems.

With the above structure, while ensuring that data on some of the sub-carriers are demodulated redundantly by both the first and second receiving systems, the size of FFT circuit included in each receiving system is reduced as compared with an FFT circuit included in a conventional apparatus.

Here, the receiving system including said FFT circuit may further include, at a location upstream from the FFT circuit: a filtering unit operable to pass components of the received OFDM signal within a frequency band of which width is substantially equal to a bandwidth to be processed by said receiving system; and a downsampling unit operable to downsample the OFDM signal components passed through the filtering unit. In addition, the receiving system including said FFT circuit may further include: a detection unit at a location downstream from the FFT circuit and operable to estimate a channel characteristic of the received OFDM signal; and a frequency converting unit located upstream from the filtering unit and operable to convert a center frequency of the frequency band to be processed by said receiving system.

With the above structures, the diversity process can be performed selectively on sub-carriers which are suffered a lot from interference so as to compensate for the fading at such sub-carriers.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings.

DESCRIPTION OF THE PREFERRED EMBODIMENT

Hereinafter, a description is given to a preferred embodiment of the present invention, with reference to the accompanying drawings.

<Structure>

Figure 1:
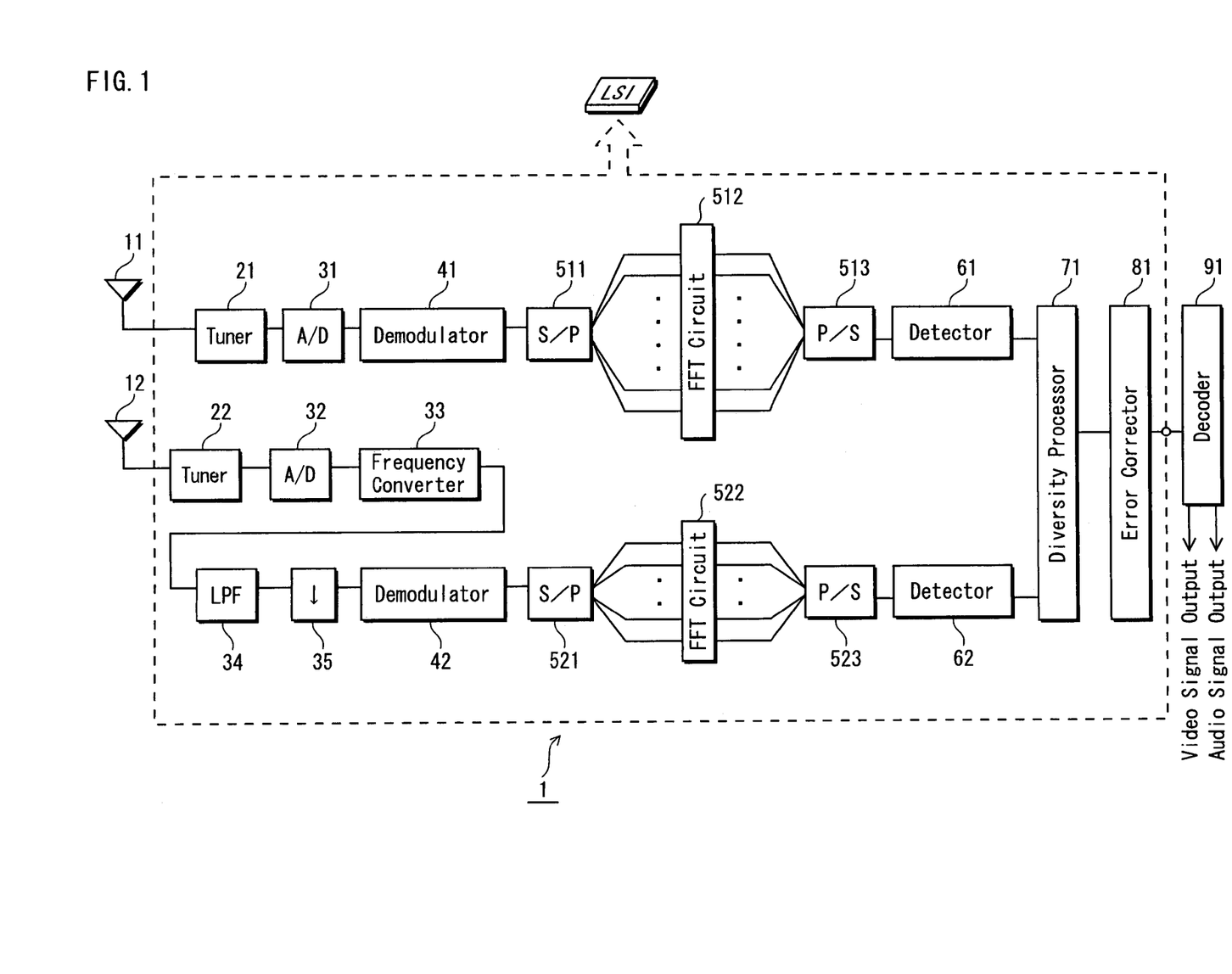
FIG. 1 shows the structure of an OFDM signal receiving apparatus 1 according to the present invention.

FIG. 1 shows the structure of an OFDM signal receiving apparatus 1.

The OFDM signal receiving apparatus 1 shown in the figure is compliant with the ISDB-T/Mode 3 system. The OFDM signal receiving apparatus 1 is composed of antennas 11 and 12, tuners 21 and 22, A/D converters 31 and 32, a frequency converter 33, an LPF (low pass filter) 34, a downsampling unit 35, orthogonal demodulators 41 and 42, SP (serial-parallel) converters 511 and 521, FFT circuits 512 and 522, PS (parallel-serial) converters 513 and 523, detectors 61 and 62, a diversity processor 71, an error corrector 81, and a decoder 91.

Note that the following components are realized by one LSI (large-scale integrated) circuit: the tuners 21 and 22, the A/D converters 31 and 32, the frequency converter 33, the LPF 34, the downsampling unit 35, the orthogonal demodulators 41 and 42, the S/P converters 511 and 521, the FFT circuits 512 and 522, the P/S converters 513 and 523, the detectors 61 and 62, the diversity processor 71, and the error corrector 81.

In addition, a branch A refers to a receiving system composed of the antenna 11, the tuner 21, the A/D converter 31, the orthogonal demodulator 41, the S/P converter 511, the FFT circuit 512, the P/S converter 513, and the detector 61. Similarly, a branch B refers to a receiving system composed of the antenna 12, the tuner 22, the A/D converter 32, the frequency converter 33, the LPF 34, the downsampling unit 35, the orthogonal demodulator 42, the S/P converter 521, the FFT circuit 522, the P/S converter 523, and the detector 62.

First, a description is given to the branch A.

An OFDM signal received with the antenna 11 is input to the tuner 21 where the frequency band of the OFDM signal is selected.

The OFDM signal on the selected frequency band is converted into digital data by the A/D converter 31.

The digital data converted by the A/D converter 31 is input to the orthogonal demodulator 41 and demodulated.

The digital data demodulated by the orthogonal demodulator 41 is input to the S/P converter 511 and converted into parallel data corresponding to the number of FFT points of the FFT circuit 512.

The FFT circuit 512 is a circuit capable of computing FFT algorithms of up to 8,192 FFT points in parallel.

The S/P converter 511 converts the demodulated serial digital data into parallel data corresponding to 8,192 FFT points.

The parallel data is then input to the FFT circuit 512 in parallel and subjected to FFT algorithms. As a result, the parallel data is converted from time domain into frequency domain.

The resulting parallel data is converted back into serial data by the P/S converter 513 and input to the detector 61.

The detector 61 detects, from the received serial data, known information called SPs (Scattered Pilots) to estimate the channel characteristic to perform synchronous detection. In addition, the detector 61 stores data of an immediately previous symbol in memory and to carry out differential detection using the currently input data and the immediately previous symbol.

Next, a description is given to the branch B.

An OFDM signal received with the antenna 12 is input to the tuner 22 where the frequency band of the OFDM signal is selected.

The OFDM signal on the selected frequency band is converted into digital data by the A/D converter 32.

The digital data converted by the A/D converter 32 is input to the frequency converter 33 where the center frequency of the digital data is converted. The center frequency is arbitrarily selectable. Thus, it is possible to select a center frequency so as to compensate for sub-carriers affected by deep fades resulting from the multipath environment.

After the center frequency modulation by the frequency converter 33, the digital data is input to the LPF 34 which only passes a frequency band to be processed by the branch B.

The digital data passed the LPF 34 is input to the downsampling unit 35 and downsampled.

After the downsampling by the downsampling unit 35, the digital data is input to the orthogonal demodulator 42 and demodulated.

The digital data demodulated by the orthogonal demodulator 42 is input to the S/P converter 521 where the digital data is converted into parallel data corresponding to the number of FFT points of the FFT circuit 522.

The FFT circuit 522 is capable of computing FFT algorithms of up to 4,096 FFT points in parallel.

The S/P converter 521 converts the demodulated serial digital data into parallel data corresponding to 4,096 FFT points.

The parallel data is input to the FFT circuit 522 in parallel and subjected to FFT algorithms. As a result, the parallel data is converted from time domain into frequency domain.

The resulting parallel data is converted back into serial data by the P/S converter 523 and the serial data is input to the detector 62.

The detector 62 performs synchronous detection and differential detection based on the input serial data.

Some of the digital data output from the detectors 61 and 62 are on the same sub-carriers and thus in redundant. The diversity processor 71 combines the redundantly demodulated digital data on a per-carrier basis.

A typical combining scheme is Maximum Ratio Combining in accordance with the power ratio between sub-carriers.

As a result, the digital data is so combined that the signal-to-noise ratio of each sub-carrier is maximum. Thus, the reception performance significantly improves as compared with the reception with a single branch.

The digital data output from the diversity processor 71 is input to the error corrector 81 where the error correction is performed.

After the error correction, the digital data is input to the decoder 91 and output as audio and video signals.

<Diversity Process>

Here, a description is given to the diversity process performed by the diversity processor 71.

Figure 2:
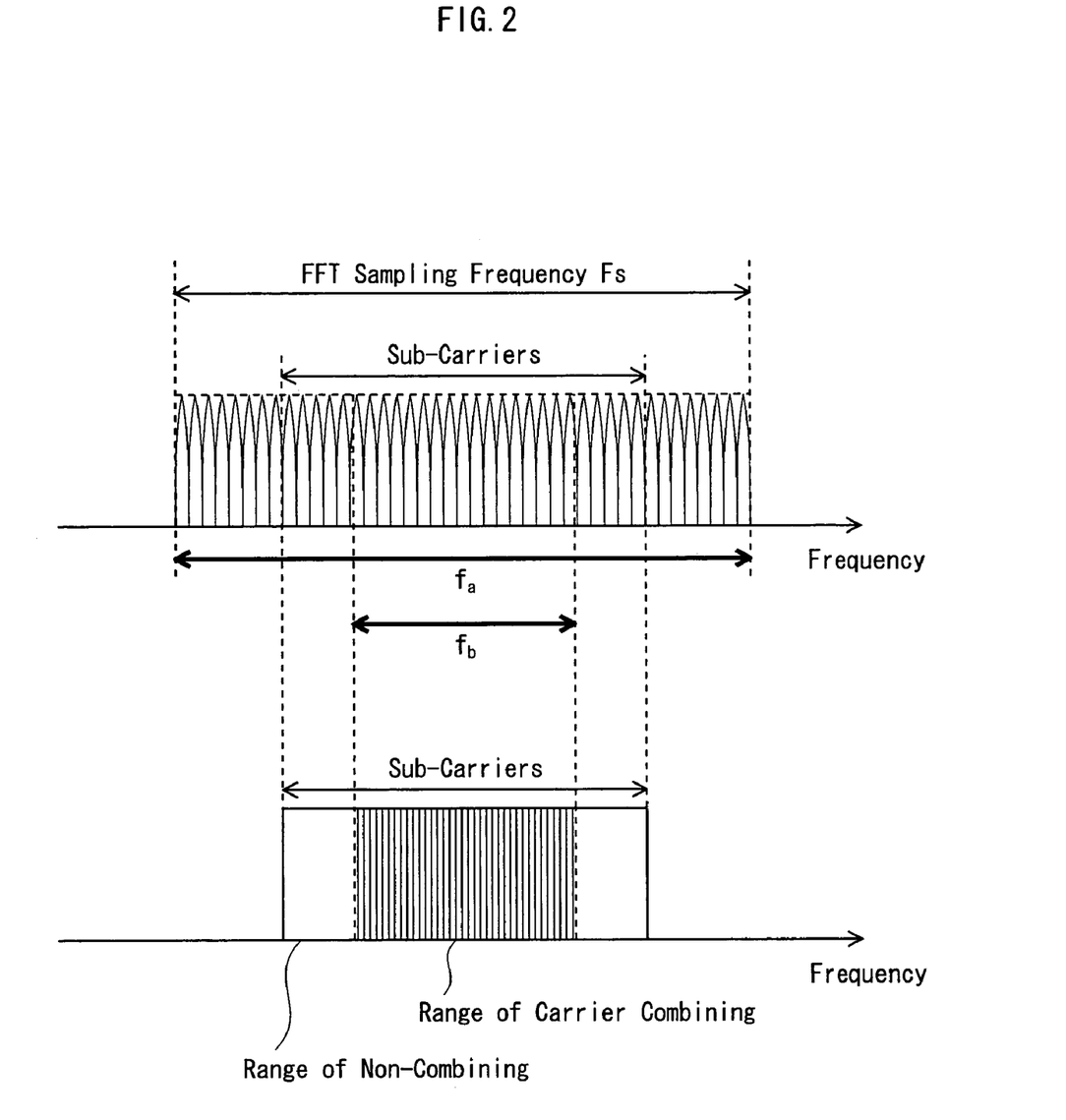
FIG. 2 shows the frequency bands fa and fb demodulated by branches A and B, respectively and also shows the frequency band subjected to a diversity process.

FIG. 2 shows frequency bands fa and fb subjected to the demodulation by the branches A and B, respectively. FIG. 2 also shows the frequency band subjected to the diversity process.

The FFT sampling frequency Fs is 512/63 MHz, which is calculated to be about 8.127 MHz.

The frequency band fa subjected to demodulation by the branch A is equal to the FFT sampling frequency Fs. Thus, the frequency band covers 5,617 sub-carriers on the 5.572 MHz bandwidth.

On the other hand, the width of the frequency band fb subjected to the demodulation by the branch B is Fs/2, which is calculated to be about 4.063 MHz, and thus covers 4,096 of the entire sub-carriers.

By combining the 4,096 sub-carriers covered by the branch B with the corresponding sub-carriers covered by the branch A, about 73% (=4,096/5617×100) out of the entire 5,617 sub-carriers are benefit from the effects of diversity reception to improve reception performance.

The effects may be smaller to that achieved by a conventional apparatus which performs the diversity process on all the sub-carriers. Yet, the reception performance is better than that with no diversity process. In addition, the FFT circuit 522 used in the branch B is about half the size of the FFT circuit 512. Thus, the entire integrated circuit can be downsized as compared with an integrated circuit used in a conventional apparatus.

Modified Embodiment

Now, a description is given to a modified embodiment of the present invention.

Figure 3:
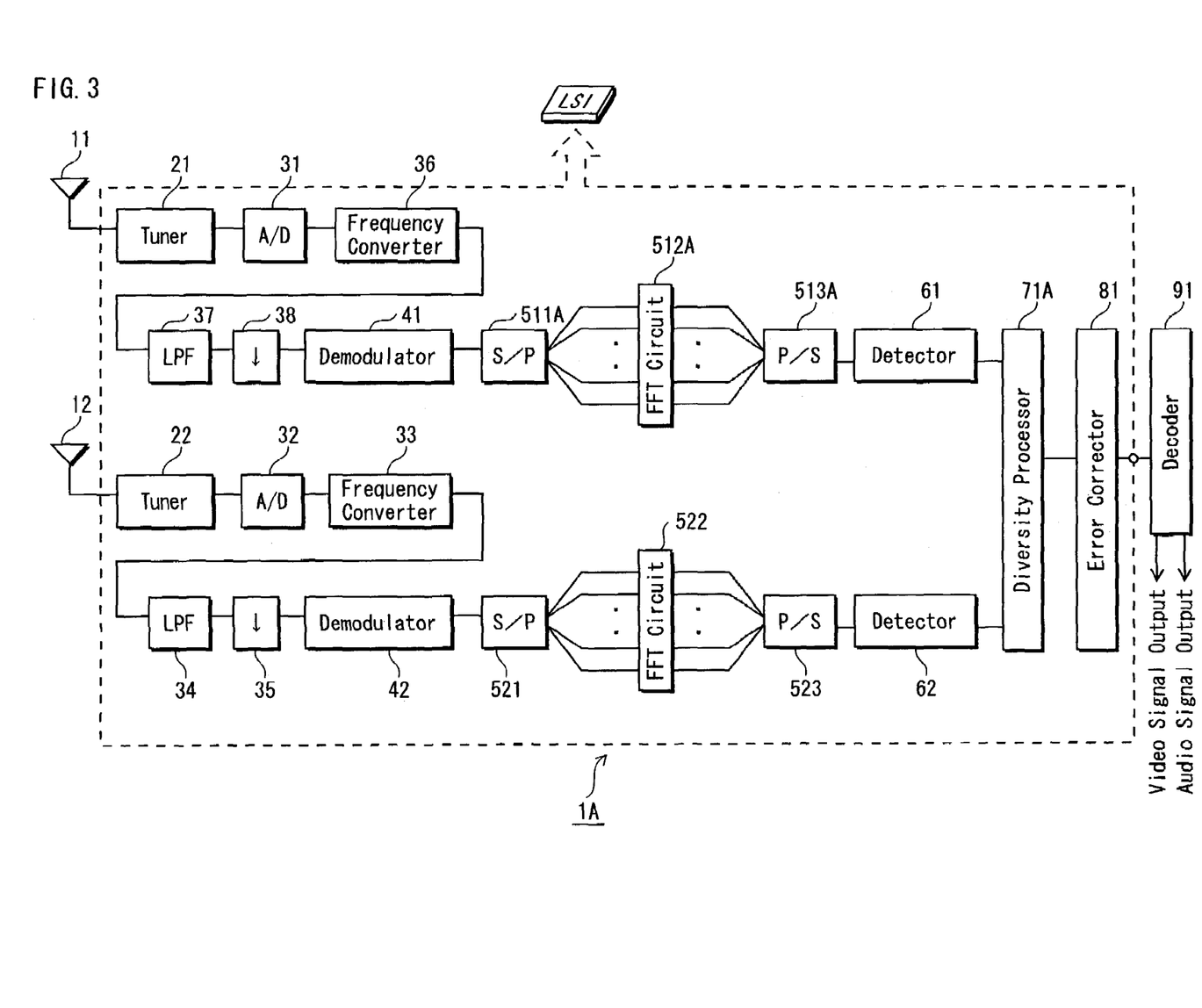
FIG. 3 shows the structure of an OFDM signal receiving apparatus 1A according to the present invention.

FIG. 3 shows the structure of an OFDM signal receiving apparatus 1A.

The OFDM signal receiving apparatus 1A is compliant with the ISDB-T/Mode 3 system. The OFDM signal receiving apparatus 1A is composed of antennas 11 and 12, tuners 21 and 22, A/D converters 31 and 32, frequency converters 33 and 36, LPFs 34 and 37, downsampling units 35 and 38, orthogonal demodulators 41 and 42, S/P converters 511A and 521, FFT circuits 512A and 522, P/S converters 513A and 523, detectors 61 and 62, a diversity processor 71A, an error corrector 81, and a decoder 91.

As shown in FIG. 3, the following components are realized by one LSI: the tuners 21 and 22, the A/D converters 31 and 32, the frequency converters 33 and 36, the LPFs 34 and 37, the downsampling units 35 and 38, the orthogonal demodulators 41 and 42, the S/P converters 511A and 521, the FFT circuits 512A and 522, the P/S converters 513A and 523, the detectors 61 and 62, the diversity processor 71A, and the error corrector 81.

In addition, a branch C refers to a receiving system composed of the antenna 11, the tuner 21, the A/D converter 31, the frequency converter 36, the LPF 37, the downsampling unit 38, the orthogonal demodulator 41, the S/P converter 511A, the FFT circuit 512A, the P/S converter 513A, and the detector 61. Similarly, a branch D refers to a receiving system composed of the antenna 12, the tuner 22, the A/D converter 32, the frequency converter 33, the LPF 34, the downsampling unit 35, the orthogonal demodulator 42, the S/P converter 521, the FFT circuit 522, the P/S converter 523, and the detector 62.

The branch C is designed to demodulate 4,096 of the sub-carriers from the lowest frequency, whereas the branch D is designed to demodulate 4,096 of the sub-carriers from the highest frequency.

Other than the demodulation frequency bands, the branches C and D are identical in structure to the branch B included in the OFDM signal receiving apparatus 1 described above. In addition, the error corrector 81 and the decoder 91 are identical to the corresponding components of the OFDM signal receiving apparatus 1 bearing the same reference numerals. Thus, no description is given thereto.

<Diversity Process>

Here, a description is given to the diversity process performed by the diversity processor 71A.

Figure 4:
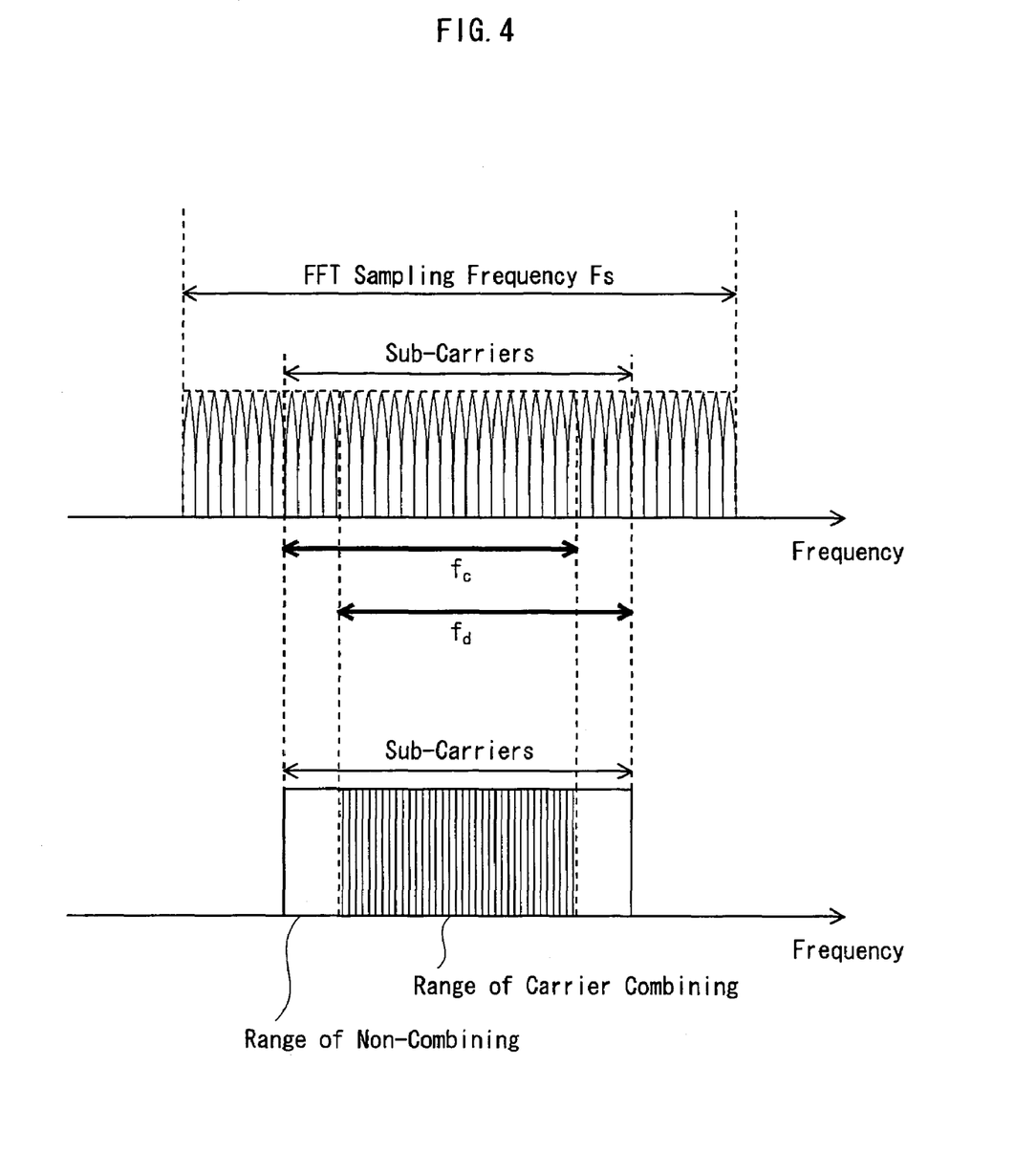
FIG. 4 shows the frequency bands fc and fd demodulated by branches C and D, respectively and also shows the frequency band subjected to a diversity process.

FIG. 4 shows the frequency bands fc and fd subjected to demodulation by the branches C and D, respectively. The figure also shows the frequency band subjected to the diversity process.

The width of the frequency band fc that the branch C demodulates is Fs/2 and coverts 4,096 of the sub-carriers from the lowest frequency.

The width of the frequency band fd that the branch D demodulates is also Fs/2 and coverts 4,096 of the sub-carriers from the highest frequency.

That means, out of 4,096 sub-carriers covered by the branch C and 4,096 sub-carriers covered by branch D, 2,575 sub-carriers are covered redundantly by both the branches. Thus, those 4,096 sub-carriers are combined with the corresponding sub-carriers one by one for improving the quality of the received signals. In other words, about 45% out of the entire 5,617 sub-carriers (=2,575/5,617×100) are benefit from the effects of diversity reception to improve the reception performance.

Comparing with the OFDM signal receiving apparatus 1 of the above embodiment, the OFDM receiving apparatus 1A of the modified embodiment improves the reception performance to a limited extent. Yet, both the FFT circuits included in the branches C and D are half the size of a conventionally used circuit. Thus, the circuit size is even smaller than that of the OFDM signal receiving apparatus 1.

<Supplemental Note>

Up to this point, the present invention has been described by way of the above embodiments. It should be naturally appreciated, however, that the present invention is not limited to the above specific embodiments.

(1) The OFDM signal receiving apparatuses 1 and 1A described above receive OFDM signals compliant with the ISDB-T/Mode 3 system. Yet, the present invention is also applicable to an OFDM signal receiving apparatus compliant with other systems including the ISDB-T/Mode 1 and 2 systems and the DVB-T system.

(2) The OFDM signal receiving apparatus 1 according to the above embodiment includes, in the branch B, the FFT circuit 522 that is capable of computing FFT algorithms of as many as 4,096 FFT points in parallel. Alternatively to the FFT circuit 522, a smaller-sized FFT circuit capable of FFT algorithms of 2,048 or 1,024 FFT points may be used.

(3) Each of the OFDM signal receiving apparatuses according to the above embodiments has two receiving systems. Yet, the present invention is not limited thereto and applicable to an OFDM signal receiving apparatus having three or four receiving systems.

(4) In the branches B, C, and D described in the above embodiments, the frequency band is limited by the LPF 34 or 37 on digital data after A/D conversion. Alternatively, the frequency band may be limited on analog signals before the A/D conversion. In addition, it is applicable to conduct filtering and downsampling of the data after the orthogonal demodulation.

(5) The demodulation frequency band of the branch B may be so determined that the center frequency coincides with or offset from the center frequency of the demodulation frequency band of the branch A. For example, by appropriately adjusting the center frequency of the branch B in accordance with the channel characteristic, higher diversity improvement is achieved.

(6) According to the above embodiments, each branch has a separate FFT circuit. Yet, it is applicable that the branches share the FFT circuit 522. In this case, OFDM signals received by the respective antennas are input to the FFT circuit 522 by time-division multiplexing, so that each branch can separately carry out the demodulation processing.

(7) The integrated circuits shown in FIGS. 1 and 3 may be packaged into separate chips for the respective functions or a chip for some of the functions. Each of such an integrated circuit may be called an IC, system LSI, super LSI, or ultra LSI, depending on the package density.

Alternatively to an LSI, the packaging into an integrated circuit may be done with the use of a dedicated circuit or a general-purpose processor. Furthermore, it is also applicable to use an FPGA (Field Programmable Gate Array), which is programmable after an LSI is manufactured, or a reconfigurable processor with which electrical connections and settings of cells in the LSI are reprogrammable.

In addition, when any new integration technique replacing an LSI becomes available as the semiconductor technology progresses or such a technique is derived from another field of technology, the functional blocks may be integrated using such a new technique. One possibility lies in adaptation of bio-technology.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An OFDM signal receiving apparatus for diversity reception of an OFDM signal with a plurality of antennas, the OFDM signal containing Y sub-carriers, where Y is a positive number satisfying $2^{X-1} < Y < 2^X$ and X is a positive number greater than 1, the apparatus comprising:

a plurality of receiving systems each independently operable to demodulate the OFDM signal received with a respective one of the antennas; and a diversity processing unit connected to the receiving systems and fed with sequences of data on sub-carriers demodulated by the respective receiving systems, wherein at least one of the receiving systems includes an FFT circuit operable to Fast Fourier transform, in parallel, only a sequence of data on $2^Z$ sub-carriers contained in the OFDM signal received with a corresponding antenna, where Z is a positive number satisfying X>Z, at least another of the receiving systems demodulates a sequence of data on some or all of said $2^Z$ sub-carriers contained in the OFDM signal received with a corresponding antenna, the respective receiving systems demodulate sequences of data so as to together cover all the Y sub-carriers, and the diversity processing unit performs a diversity process on the sequences of data on sub-carriers, out of all the Y sub-carries, redundantly demodulated by two or more of the receiving systems.

2. The OFDM signal receiving apparatus according to claim 1, wherein the receiving systems are a first receiving system and a second receiving system connected to a different one of the antennas, the first receiving system includes said FFT circuit, the second receiving system includes a second FFT circuit operable to Fast Fourier transform in parallel a sequence of data on the Y sub-carriers, and the diversity processor performs a diversity process on sequences of data on said $2^Z$ sub-carriers, out of all the Y sub-carries, redundantly demodulated by the first and second receiving systems.

3. The OFDM signal receiving apparatus according to claim 1, wherein the receiving systems are a first receiving system and a second receiving system connected to a different one of the antennas, the first and second receiving systems each include said FFT circuit and demodulate sequences of data, so that the data sequences together cover all the Y sub-carriers and that data on some of the Y sub-carriers are redundantly demodulated by both the first and second receiving systems, and the diversity processing unit performs a diversity process on sequences of data on sub-carriers, out of all the Y sub-carries, redundantly demodulated by the first and second receiving systems.

4. The OFDM signal receiving apparatus according to claim 1, wherein the receiving system including said FFT circuit further includes, at a location upstream from the FFT circuit:

a filtering unit operable to pass components of the received OFDM signal within a frequency band of which width is substantially equal to a bandwidth to be processed by said receiving system; and a downsampling unit operable to downsample the OFDM signal components passed through the filtering unit.

5. The OFDM signal receiving apparatus according to claim 4, wherein the receiving system including said FFT circuit further includes:

a detection unit at a location downstream from the FFT circuit and operable to estimate a channel characteristic of the received OFDM signal; and a frequency converting unit located upstream from the filtering unit and operable to convert a center frequency of the frequency band to be processed by said receiving system.

6. An integrated circuit included in an OFDM signal receiving apparatus for diversity reception of an OFDM signal with a plurality of antennas, where Y is a positive number satisfying $2^{X-1}<Y<2^X$ and X is a positive number greater than 1, the integrated circuit comprising:

a plurality of receiving systems each independently operable to demodulate the OFDM signal received with a respective one of the antennas; and a diversity processing unit connected to the receiving systems and fed with sequences of data on sub-carriers demodulated by the respective receiving systems, wherein at least one of the receiving systems includes an FFT circuit operable to Fast Fourier transform, in parallel, only a sequence of data on $2^Z$ sub-carriers contained in the OFDM signal received with a corresponding antenna, where Z is a positive number satisfying X>Z, at least another of the receiving systems demodulates a sequence of data on some or all of said $2^Z$ sub-carriers contained in the OFDM signal received with a corresponding antenna, the respective receiving systems demodulate sequences of data so as to together cover all the Y sub-carriers, and the diversity processing unit performs a diversity process on the sequences of data on sub-carriers, out of all the Y sub-carries, redundantly demodulated by two or more of the receiving systems.

* * * * *